United States Patent [19]

Miller

[11] 4,089,169

[45] May 16, 1978

[54] PRESSURE ACTUATED SIGNAL FLUID CONTROL FOR LOAD RESPONSIVE SYSTEMS

[75] Inventor: Wendell E. Miller, Warsaw, Ind.

[73] Assignee: The Scott & Fetzer Company, Kokomo, Ind.

[21] Appl. No.: 716,019

[22] Filed: Aug. 19, 1976

[51] Int. Cl.$^{2}$ .................................................. F16H 39/46

[52] U.S. Cl. .......................................... 60/445; 60/450; 60/484; 91/444; 137/118; 137/596.13

[58] Field of Search .................... 137/118, 119, 596.13; 91/414, 444, 448; 60/445, 450, 459, 468, 493, 494, 484

[56] References Cited

U.S. PATENT DOCUMENTS

| | | | |
|---|---|---|---|
| 2,830,767 | 4/1958 | Herbenar | 137/119 X |
| 3,447,556 | 6/1969 | Howeth | 137/119 X |
| 3,456,442 | 7/1969 | Brooks | 60/468 X |
| 3,878,864 | 4/1975 | Schurger | 137/596.13 |
| 3,971,216 | 7/1976 | Miller | 60/445 |

*Primary Examiner*—Edgar W. Geoghegan

*Attorney, Agent, or Firm*—McNenny, Pearne, Gordon, Gail, Dickinson & Schiller

[57] ABSTRACT

A hydraulic system includes a fluid responsive means that controls the effective output of the pump in response to pressurization of signal fluid that is supplied by the pump. The signal fluid is pressurized by flowing through a synthetic signal generator and on into a fluid motor in opposition to the working pressure therein. This signal fluid is directed to the fluid motor by the directional control valve when the directional control valve is in an operating position; and it is directed to a sump by the directional control valve when the directional control valve is in a standby position. The present invention provides pressure actuated means to divert or occlude this signal fluid from the directional control valve except when the directional control valve provides a load sensing flow path which communicates this signal fluid to the fluid motor.

44 Claims, 11 Drawing Figures

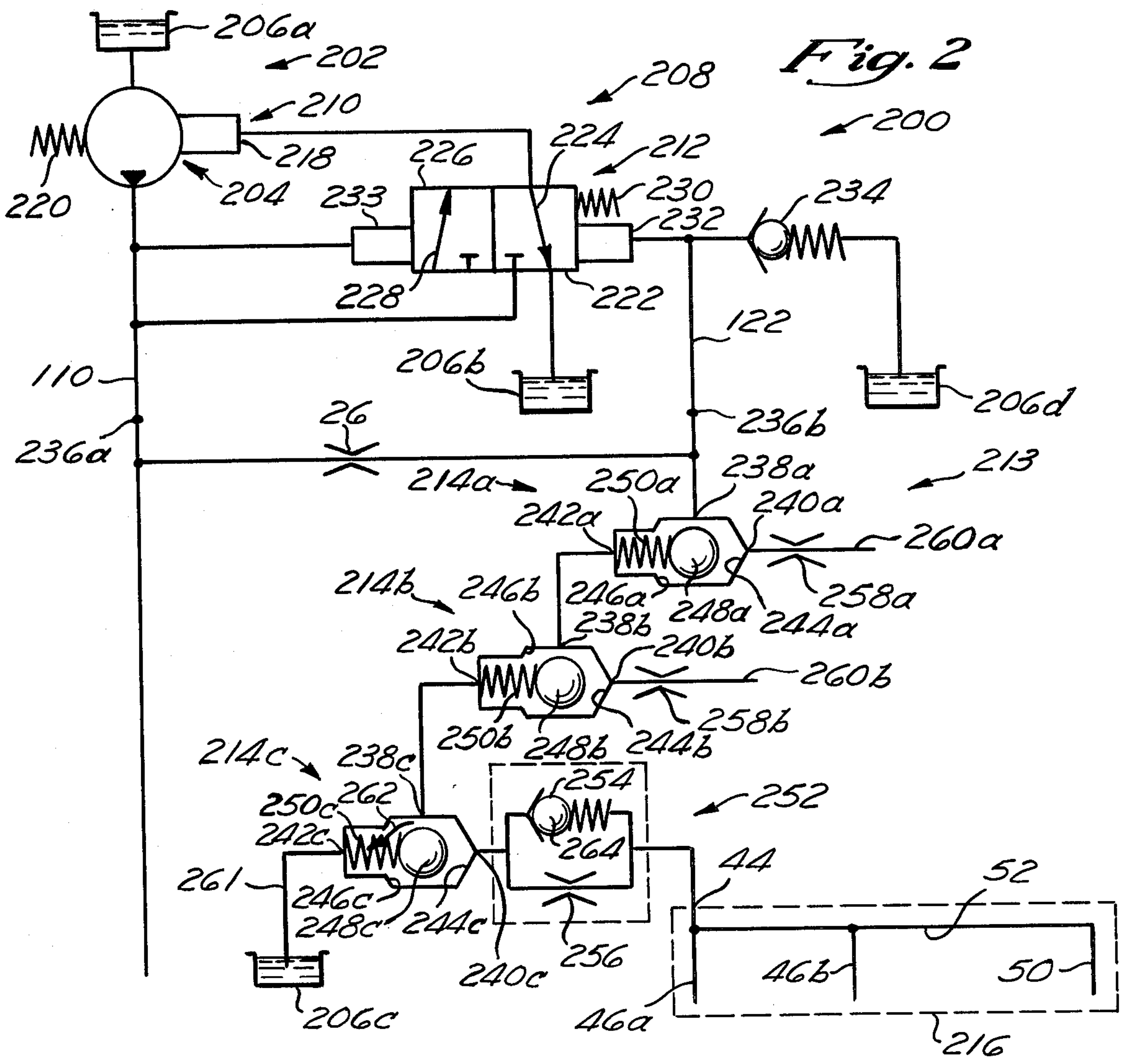
Fig. 2
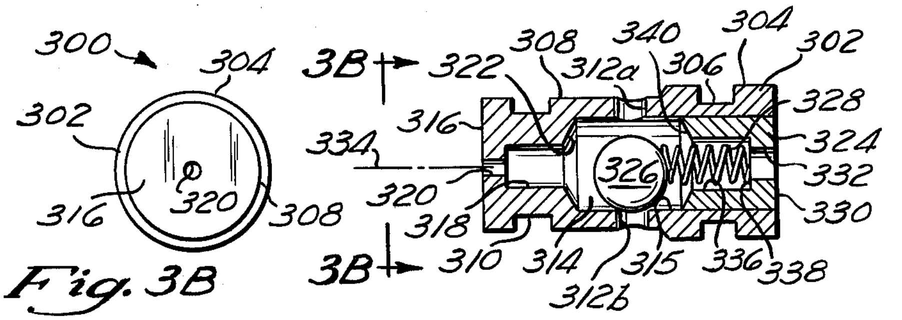
Fig. 3B
Fig. 3A
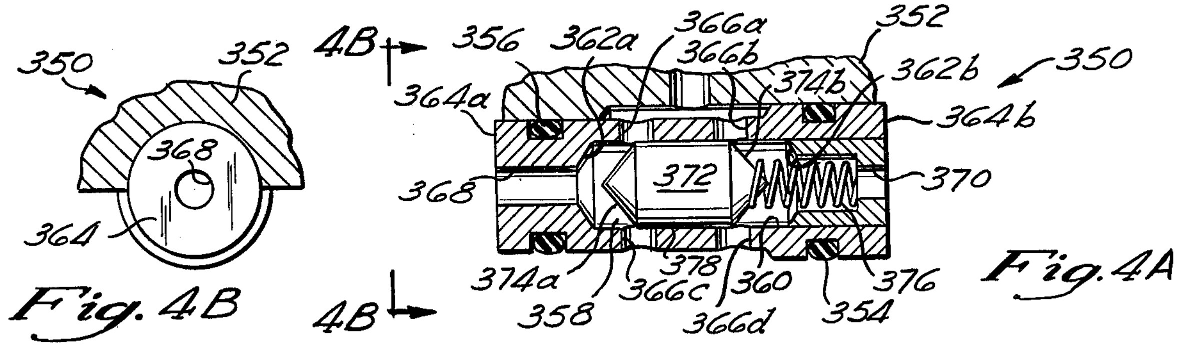
Fig. 4B
Fig. 4A

PRESSURE ACTUATED SIGNAL FLUID CONTROL FOR LOAD RESPONSIVE SYSTEMS

BACKGROUND OF THE INVENTION

1. Field of the Invention

The present invention relates generally to load responsive hydraulic systems in which the effective output of the pump is controlled by the difference between the load actuating pressure of a fluid motor and the pump pressure; that is, the effective output of the pump is controlled to provide the required pump flow at a pressure that is at a predetermined pressure magnitude above the load actuating pressure. In systems using fixed displacement pumps, the effective output of the pump is controlled by bypassing excess pump flow to a sump; whereas, in variable displacement or variable discharge pumps, a displacement control mechanism directly controls the output of the pump.

More particularly, the present invention relates to load responsive systems that utilize a synthetic signal generator to pressurize this signal fluid to a predetermined pressure magnitude above the load actuating pressure of the fluid motor. This synthetic signal principle is fully disclosed in U.S. Pat. No. 3,971,216, of common assignee.

2. Description of the Prior Art

In U.S. Pat. No. 3,971,216, of common assignee, a load responsive hydraulic system is disclosed in which a signal fluid is supplied by the pump, is pressurized by flowing through a synthetic signal generator which comprises a relief valve or an orifice, and flows on into a fluid motor in opposition to the load actuating pressure therein. The result is that this signal fluid is pressurized to a synthetic signal pressure which is at a predetermined pressure magnitude above the load actuating pressure.

In load responsive hydraulic systems of the synthetic signal generator type, as described above, and as disclosed in the reference patent, when the directional control valve is actuated from a standby position to an operating position, the directional control valve must provide one fluid flow path for the synthetic signal fluid to flow to one motor port of the fluid motor and another fluid flow path from the other motor port to a sump before blocking the flow of the signal fluid to a sump. Otherwise, the flow of signal fluid will be momentarily blocked as the directional control valve is moved from the standby position to an operating position, the signal fluid will be excessively pressurized by this blocking, and the pump will be excessively pressurized momentarily. The present invention provides pressure actuated means for alleviating this timing problem in the directional control valve.

SUMMARY OF THE INVENTION

In accordance with the broader aspects of this invention, there is provided a load responsive hydraulic system of the type which includes a source of pressurized fluid having a pump and a sump, a fluid actuated device, a directional control valve having a movable valving element therein, and a fluid responsive means having a signal chamber therein.

The movable valving element has an operating position wherein fluid from the pump is supplied to the fluid actuated device at the load actuating pressure thereof and a standby position wherein the fluid actuated device is isolated from the pump.

The fluid responsive means is operatively connected to the pump and is effective to control the effective output of the pump in response to the pressure magnitude of a signal fluid which is applied to the signal chamber.

The present invention also includes signal control means, including a signal control port in the directional control valve and including cooperating portions of the valving element therein. The signal control means is effective to establish a load sensing flow path which communicates the signal control port with the fluid actuated device to sense the load actuating pressure therein when the control valve is in the operating position. The signal control means is also effective to establish an attenuation flow path which communicates the signal control port with the sump to attenuate the signal pressure in the signal control port by fluid flow to a proximal sump, when the movable valving element of the directional control valve is in the standby position.

The present invention further includes signal fluid supply and logic means. The signal fluid supply and logic means includes a signal fluid supply restrictor that is connected to the pump and that is operatively connected to the signal chamber of the fluid responsive means. The signal fluid supply and logic means further comprises a logic port being operatively connected to the signal control port in the directional control valve. The signal fluid supply and logic means is effective to further limit the rate of fluid flow of the signal fluid from the pump to the logic port except when the logic port is pressurized.

In a first embodiment of the present invention, a plurality of three port logic valves are series connected between the signal chamber and a signal control port of the directional control valve and provide a plurality of logic ports for connection to a plurality of additional directional control valves. In this embodiment, the means for further limiting the rate of fluid flow of the signal fluid from the pump to the logic port comprises a signal fluid diverter valve. This signal fluid diverter valve is interposed between the signal chamber and the series connected logic valves, and provides a flow path from the signal chamber to a sump which bypasses and is exclusive from the attenuation flow path which is established by the series connected logic valves and the signal control means.

In a preferred embodiment, this signal fluid diverter valve comprises a three-port logic valve of the ball shuttle type having a spring for resiliently urging the ball shuttle away from the logic port which communicates with the sump.

In a second embodiment, each of the series connected three-port logic valves includes a ball shuttle and a bias spring. Each of the bias springs is effective to move its respective ball shuttle away from one of the respective logic ports therein and thereby to predictably establish an attenuation flow path from the signal chamber to a sump which is connected downstream of the last of the three-port logic valves. Thus, in the second embodiment, an attenuation flow path is established from the signal chamber to a sump that is exclusive and separate from the attenuation flow path in the signal control means.

In a third embodiment of the present invention, the means for further limiting the rate of fluid flow of signal fluid from the pump to the logic port comprises an occluder valve which is connected in series with the signal fluid supply restrictor, which is interposed either between the signal fluid supply restrictor and a pump or between the signal fluid supply restrictor and the signal chamber, and which is pressure actuated to open fluid communication from the pump to the signal chamber only when the movable valving element of the directional control valve establishes the load sensing flow path to the fluid actuated device and thereby applies the load actuating pressure of a fluid actuated device to operate the occluder valve.

It is a first object of this invention to provide means for further limiting the rate of fluid flow of signal fluid from a pump to a logic port of a load responsive system of the synthetic signal type except when the logic port is pressurized.

It is a second object of this invention to provide a diverter valve for further limiting the rate of fluid flow of signal flow from the pump to the logic port of a load responsive hydraulic system of the synthetic signal type except when the logic port is pressurized.

It is a third object of this invention to provide an occluder valve for blocking fluid flow of the signal fluid from the pump to the logic port of a load responsive hydraulic system of the synthetic signal type except when the logic port is pressurized.

It is a fourth object of this invention to provide a logic system for a load responsive hydraulic system in which a plurality of spring biased and series connected three-port logic valves are utilized to provide a predictable flow path from the signal chamber to a sump.

It is a fifth object of this invention to provide a three-port logic valve of the ball shuttle type in which the logic valve includes resilient bias means for resiliently urging the ball shuttle away from one of the logic ports therein.

The abovementioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings:

FIG. 2 is a schematic drawing of a second embodiment of the present invention in which a plurality of spring biased and series connected three-port logic valves are utilized to provide a predictable flow path from a signal fluid supply restrictor to a sump;

FIG. 3A is a cross sectional drawing of a three-port logic valve of the ball shuttle type which includes the resilient bias means of the present invention;

FIG. 3B is an end view of the logic valve of FIG. 3A, taken substantially as shown by view line 3B—3B;

FIG. 4A is a cross sectional drawing of a three-port logic valve of the piston shuttle type which also utilizes the resilient bias means of the present invention;

FIG. 4B is an end view of the logic valve of FIG. 4A, taken substantially as shown by view line 4B—4B;

DESCRIPTION OF THE PREFERRED EMBODIMENTS

A First Embodiment of the System

Figure 1:
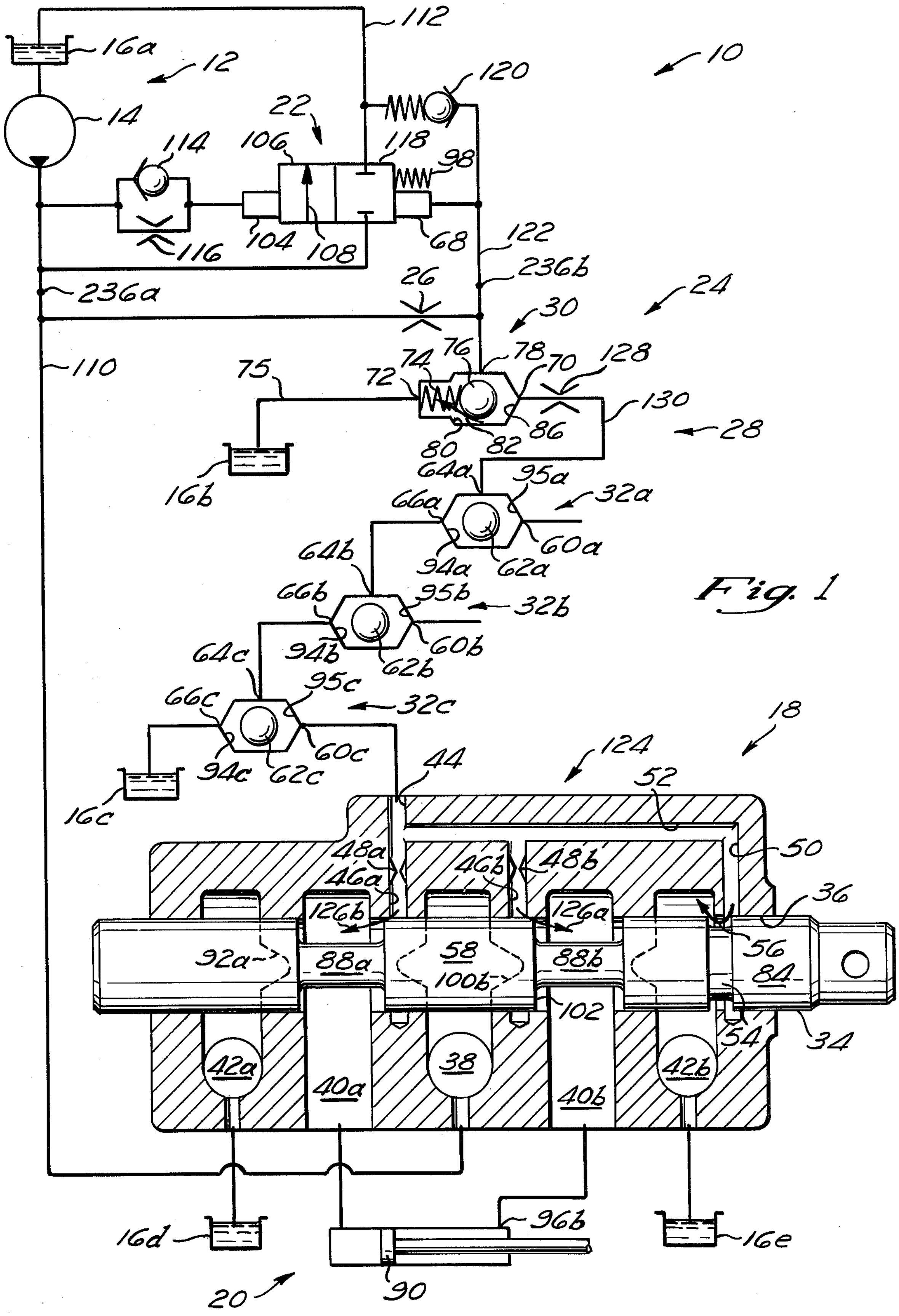
FIG. 1 is a schematic and cross sectional drawing of a first embodiment of the present invention in which a diverter valve is interposed intermediate of a signal fluid supply restrictor and a plurality of series connected three-port logic valves.

Referring now to the drawings, and more particularly to FIG. 1, a load responsive hydraulic system 10 includes a source of pressurized fluid 12 that includes both a fixed displacement pump 14 and a plurality of sumps **16*a*–16*e*, a directional control valve 18, a fluid actuated device or fluid motor 20, a fluid responsive means or bypass valve 22, and a signal fluid supply and logic means 24 which includes both a signal fluid supply means or signal fluid supply restrictor 26 and a signal fluid logic means 28. The signal fluid logic means 28 includes a diverter valve or logic valve 30 and a plurality of three-port logic valves 32*a*–32*c***.

The directional control valve 18 includes a movable valving element or valve spool 34 which is slidably fitted into a spool bore 36 and which is movable from a standby position, as shown, to operating positions wherein inlet pressure port 38 is selectively communicated to either a work port **40*a* or a work port 40*b* and wherein respective ones of the work ports 40*a* and 40*b* are selectively communicated to respective ones of return ports 42*a* and 42*b*** in conventional manner.

The directional control valve 18 includes a signal control port 44, load signal passages **46*a* and 46*b* which additionally include synthetic signal generators or orifices 48*a* and 48*b*, attenuation signal passage 50 and longitudinal passage 52**.

In operation, with movable valving element 34 in the standby position as shown, attenuation signal passage 50 cooperates with a reduced diameter portion 54 of movable valving element 34 to provide an attenuation flow path 56 which communicates signal control port 44 with sump **16*e* via return port 42*b* of directional control valve 18. Also, with movable valving element 34 in the standby position as shown, load signal passages 46*a* and 46*b* are blocked from fluid communication with either inlet pressure port 38 or work ports 40*a* and 40*b* by spool land 58 of movable valving element 34**.

The series connected three-port logic valves **32*a* and 32*b* each include a logic port, 60*a* or 60*b*, for connection to a signal control port (not shown) of a directional control valve (not shown) such as logic port 60*c* that is connected to signal control port 44 of directional control valve 18. So, with directional control valves similar to that of directional control valve 18 being connected to respective ones of logic ports 60*a* and 60*b*, each of the logic ports 60*a*–60*c* are connected to a sump through the attenuation signal passage 50 or a similar attenuation signal passage (not shown) of two other directional control valves (not shown). Thus, without regard to the gravity, or chance location, of ball shuttle or blocking means 62a, a fluid flow path will always be open between logic port 64a and one of the logic ports, 60a or 66a. In like manner, ball shuttle 62b can not, at the same time, block both logic ports 60b and 66b. Thus it is apparent that there will always be an attenuation flow path from logic port 64a to a sump: through attenuation signal passage 50 of directional control valve 18 to sump 16e, or through an attenuation signal passage (not shown) similar to attenuation signal passage 50 and a directional control valve (not shown) similar to directional control valve 18 to a sump (not shown, similar to sump 16e), or through logic port 66c to sump 16c. Therefore, with movable valving element 34 in the standby position, as shown, there is an attenuation flow path from signal chamber 68, of fluid responsive means or bypass valve 22**, to a sump.

At this same time, with any pressure in logic port 70 of diverter valve 30 attenuated by fluid flow to a sump, such as sump 16e, and with only sump pressure existing in logic port 72 of diverter valve 30, resilient bias means or spring 74 is effective to actuate ball shuttle 76 away from logic port 72 to provide an additional or auxiliary attenuation fluid flow path from signal chamber 68 of fluid responsive means 22 and logic port 78 of diverter valve 30, to sump 16b via conduit 75.

Summarizing the operation of the FIG. 1 configuration, with valving element 34 in the neutral or standby position as shown, any fluid pressure in logic port 70 of diverter valve 30 is attenuated by fluid flow through logic port 66c to sump 16c, or through signal control port 44, attenuation flow path 56, and return port 42b to sump 16e, or through logic port 60a and an attenuation flow path (not shown) in a control valve (not shown) to a sump (not shown), or through logic port 60b and an attenuation flow path (not shown) in a control valve (not shown) to a sump (not shown).

Then, with both logic ports 70 and 72 of diverter valve 30 communicated to sump pressure, spring 74 is effective to resiliently move ball shuttle or blocking means 76 away from sealing engagement with seat 80 so that an additional or auxiliary attenuation flow path 82 is established from signal chamber 68 of fluid responsive means or bypass valve 22, and from signal fluid supply restrictor 26, to sump 16b.

Referring again to FIG. 1, when valving element 34 is moved to the left toward a first operating position, reduced diameter portion 54 is moved from communication with attenuation signal passage 50 and land portion 84 blocks attenuation flow path 56. This blocking of attenuation flow path 56 stops any flow of signal fluid from signal fluid supply restrictor 26 from flowing to sump 16e. The signal fluid may have been flowing both through logic port 72 to sump 16b and through attenuation flow path 56 to sump 16e, because spring 74 of diverter valve 30 is preferably sized to have a length to move ball shuttle 76 away from seat 80 but not into contact with seat 86.

It should be particularly noticed that this blocking of attenuation flow path 56 does not block the free flow of the signal fluid to a sump because of the functioning of diverter valve 30. Thus the opening of load signal passage 46b to work port 40b to provide a place to which the signal fluid can flow, that is, the opening of a flow path to fluid motor 20, and the opening of work port 40a to return port 42a and sump 16d via reduced diameter portion 88a to allow piston 90 of fluid motor 20 to be moved by the signal fluid, is not required at this time.

Therefore, a primary advantage of the present invention is that attenuation flow path 56 may be closed before opening load signal passage 46b to work port 40b and before opening work port 40a to return port 42a. Otherwise, either the flow of signal fluid would be blocked and the system pressure would surge to an undesirable level, or fluid would be lost from work port 40b through load signal passage 46b and attenuation flow path 56, depending upon the relative lengths and locations of spool land 58 and reduced diameter portion 54.

When valving element 34 is moved farther to the left, toward a first operating position, work port 40a is communicated with return port 42a by reduced diameter portion 88a communicating with notch 92a, and load signal passage 46b is communicated with work port 40b by reduced diameter portion 88b.

At this time, pressurized fluid from work port 40b actuates ball shuttle 62c into sealing engagement with seat 94c, then actuates ball shuttle 62b into sealing engagement with seat 95b, then actuates ball shuttle 62a into sealing engagement with seat 95a, and then actuates ball shuttle 76 against the force of spring 74 into sealing engagement with seat 80 of diverter valve 30, thereby blocking auxiliary attenuation flow path 82 and establishing a flow path from signal fluid supply restrictor 26 and signal chamber 68 to work port 40b and motor port 96b.

Then the signal fluid, as supplied by signal fluid supply restrictor 26 is pressurized to a synthetic signal pressure whose pressure magnitude is the sum of the load actuating pressure in motor port 96b and the pressure differential across synthetic signal generator or fluid restrictor 48b; and the pressure of pump 14 is controlled by bypass valve 22 to be the sum of the synthetic signal pressure plus a pressure differential as caused by spring 98 of bypass valve 22.

Then, when movable valving element 34 is moved farther to the left, to a first operating position, a throttling orifice is formed between notch 100b and end 102 of spool land 58. Since, at this time, the pressure of pump 14 is controlled to a predetermined pressure magnitude above the load actuating pressure in work port 40b, the flow through this throttling orifice will be approximately proportional to the cross sectional flow area of this throttling orifice, and since the cross sectional flow area of this orifice is selectively adjustable by positioning of the valving element 34 within the first operating position, the fluid flow to fluid motor 20 can be accurately controlled.

Referring again to FIG. 1, bypass valve 22 includes operator 104 which has a projected end area or fluid responsive area that is equal to the fluid responsive area of signal chamber 68; so that bypass valve 22 is moved to position 106, whereas flow path 108 communicates pressure conduit 110 to sump conduit 112 when the pump pressure in operator 104 exceeds the synthetic signal pressure in signal chamber 68 by a pressure magnitude that equals or exceeds the force of spring 98 divided by the fluid responsive area of operator 104.

Check valve 114 and orifice 116 may optionally be used to allow rapid movement of bypass valve 22 to position 106 and yet to restrict movement to position 118.

Pilot relief valve 120 may be used to limit the pressure magnitude of the signal fluid in signal conduit 122, thereby to limit the maximum pressure that is required in operator 104 to move bypass valve 22 to position 106, and thereby to limit the maximum pressure of pump 14.

System 10 includes signal control means 124 which includes such cooperating portions of valving element 34 as reduced diameter portion 54 and spool land 58, which includes attenuation signal passage 50 and reduced diameter portion 54 to provide attenuation flow path 56, and which includes load signal passages 46*a* and 46*b* in cooperation with spool land 58 to provide load sensing flow paths 126*a* and 126*b*.

Another advantage of system 10 of FIG. 1 is that a single synthetic signal generator or fluid restrictor 128 may be interposed into signal conduit 130 and may be used to raise the load actuating pressure in both work ports 40*a* and 40*b* to a synthetic signal pressure and also to raise, to a synthetic signal pressure, the load actuating pressure of any fluid motors (not shown) which are actuated by control valves (not shown) that are connected to logic ports 60*a* and 60*b*. This is possible because the attenuation flow through synthetic signal generator 128 and through an attenuation flow path, such as flow path 56, needs only sufficient flow rate to reduce the fluid pressure in logic port 70 to a point wherein spring 74 is able to move ball shuttle 76 away from seat 80; and then auxiliary attenuation flow path 82 provides free flow of the signal fluid to sump 16*b*, so that a low standby pressure can be achieved.

In standard manufacturing practice, each of the directional control valves, such as control valve 18, preferably includes a logic valve, such as logic valve 32*c*. However, the last control valve in the logic circuit, such as control valve 18, does not need a logic valve. Thus, in the FIG. 1 embodiment, logic valve 32*c* can be omitted and logic port 66*b* of logic valve 32*b* can be directly connected to signal control port 44.

A Second Embodiment of the System

Referring now to FIG. 2, load responsive hydraulic system 200 includes a source of pressurized fluid 202 which comprises variable displacement pump 204 and sumps 206*a*–206*d*, a fluid responsive means 208 which comprises displacement control mechanism 210 and pilot valve 212, signal fluid supply and logic means 213 which comprises signal fluid supply means or signal fluid supply restrictor 26 and series connected and spring biased logic valves 214*a*–214*c*, and a directional control valve (not shown, similar to control valve 18 of FIG. 1) which is schematically represented in part by box or signal control means 216.

Displacement control mechanism 210 includes operator 218 and spring 220, is of any of the known constructions, and, preferably, reduces the displacement of pump 204 by the addition of fluid to operator 218.

Pilot valve 212 includes position 222 wherein flow path 224 exhausts fluid from operator 218 to increase the displacement of pump 204, and position 226 wherein flow path 228 communicates pressure conduit 110 to operator 218 to decrease the displacement of pump 204.

Pilot valve 212 also includes spring 230, signal chamber 232, and operator 233 which cooperate to actuate pilot valve 212 to positions 222 and 226 as previously described for the same named parts of bypass valve 22 of FIG. 1.

Pilot relief valve 234 functions in system 200 as was described for pilot relief valve 120 in system 10 and is a part of fluid responsive means 208 even as pilot relief valve 120 is a part of fluid responsive means 22.

Referring now to FIGS. 1 and 2, source 12 and fluid responsive means 22 of FIG. 1 will interchange with source 202 and fluid responsive means 208 of FIG. 2 by disconnecting and interchanging these components at points 236*a* and 236*b*. That is, both will work with either signal fluid supply and logic means 24 and signal control means 124 of FIG. 1, or with signal fluid supply and logic means 213 and signal control means 216 of FIG. 2.

Box or signal control means 216 schematically represents similarly numbered parts of FIG. 1 and includes signal control port 44, load signal passages 46*a* and 46*b*, attenuation signal passage 50, and longitudinal passage 52.

Referring back to FIG. 2, spring biased logic valves 214*a*, 214*b*, and 214*c* are identical so one description will suffice for all three. Spring biased logic valve 214*a* includes logic ports 238*a*, 240*a*, and 242*a*, seats 244*a* and 246*a*, ball shuttle or blocking means 248*a* which selectively seals against seats 244*a* and 246*a* to selectively block logic ports 240*a* and 242*a* from logic port 238*a*, and resilient bias means or spring 250*a*.

A synthetic signal generator 252, which includes relief valve 254 and fluid restrictor 256, is interposed between spring biased logic valve 214*c* and signal control port 44; and two synthetic signal generators or fluid restrictors 258*a* and 258*b* are interposed into logic conduits 260*a* and 260*b*.

Referring again to system 200 of FIG. 2, in operation, when load signal passage 46*b* is communicated to a load actuating pressure in the manner described for system 10 of FIG. 1, pressurized fluid from the fluid motor (not shown), flows through fluid restrictor 256 to actuate ball shuttle 248*c* against the opposition of spring 250*c* into sealing contact with seat 246*c*. Then, ball shuttles 248*b* and 248*a* are actuated into sealing contact with seats 244*b* and 244*a*; so that signal fluid from signal fluid supply restrictor 26 flows to load signal passage 46*b*, is pressurized by the load actuating pressure therein, and is additionally pressurized by flowing through synthetic signal generator 252.

When communication of load signal passage 46*b* with the load actuating pressure is blocked, and when attenuation signal passage 50 is communicated with a sump (not shown), then the fluid pressure in logic port 240*c* is attenuated by flow through fluid restrictor 256, spring 250*c* moves ball shuttle 248*c* away from seat 246*c* thereby communicating logic port 238*c* with conduit 261 and sump 206*c* and communicating signal chamber 232 and signal fluid supply restrictor 26 to sump 206*c*.

Thus, the series connected and spring biased logic valves 214*a*, 214*b*, and 214*c* provide an additional or auxiliary attenuation flow path 262 to sump 206*c*, thereby achieving valving element timing advantages similar to those described for system 10 of FIG. 1.

In contrast with system 10 of FIG. 1 wherein the use of logic valve 32*c* is optional and is usually included for manufacturing standardization only, logic valve 214*c* of FIG. 2 is essential, because it is the last logic valve that provides the auxiliary attenuation flow path to a sump.

The embodiment of FIG. 2 includes signal fluid supply and logic means 213 which is comparable in function to signal fluid supply and logic means 24 of FIG. 1 and which comprises signal fluid supply restrictor 26 and logic valves 214*a*–214*c*.

Another advantage is that a synthetic signal generator, such as synthetic signal generator 252 can be located at a point wherein attenuation signal flow goes through the synthetic signal generator. As described for system 10 of FIG. 1, attenuation signal passage 50 and the flow through the synthetic signal generator, such as 252, lowers the pressure in logic port 240c sufficiently for spring 250c to move ball shuttle 248c away from seat 246c, and then auxiliary attenuation flow path 262 to sump 206c provides sufficiently free flow of signal fluid to sump 206c so that a low standby pressure is achieved.

A greater advantage is realized in the FIG. 1 configuration in that a single synthetic signal generator 128 may be used and be in all load sensing flow paths, such as load sensing flow paths 126a and 126b of control valve 18, to sense any load actuating pressure, and the single synthetic signal generator may be in all attenuation flow paths such as attenuation flow path 56, without the single synthetic signal generator, such as synthetic signal generator 128, adversely affecting a low standby pressure of the pump.

Referring again to FIG. 2, synthetic signal generators 258a and 258b are preferably of the orifice or capillary tube type; and their chief advantage is low cost. In contrast, synthetic signal generator 252 includes relief valve 254 which gives the advantage of a smaller change in pressure for a given change in flow rate than does an orifice or capillary tube. However, synthetic signal generator 252 requires parallel connected fluid restrictor 256 for two reasons. The first reason is that reverse fluid flow, from signal control port 44 to logic port 240c, is required to pressure actuate ball shuttle 248c into sealing engagement with seat 246c. The second reason is that relatively free flow is required from logic port 240c, through signal control port 44, and through an attenuation flow path, such as attenuation flow path 56 of FIG. 1, in order that auxiliary attenuation flow path 262 of FIG. 2, or auxiliary attenuation flow path 82 of FIG. 1, may be opened. Thus fluid restrictor 256 is required to provide limited bidirectional fluid flow without unseating ball poppet 264; and if this requirement for bi-directional fluid flow is met, synthetic signal generators of the type illustrated by synthetic signal generator 252 may be used interchangeably with fluid restrictors 48a, 48b, 128, 258a, and 258b.

A First Embodiment of the Logic Valve

Referring now to FIGS. 3A and 3B, a preferred embodiment of a spring biased logic valve 300 is shown. Logic valve 300 is usable in the system embodiment of FIG. 1 as diverter valve 30 or as any of the logic valves 214a, 214b, or 214c, of FIG. 2.

Logic valve 300 preferably includes a shuttle body 302 rather than being an integral part of a directional control valve such as control valve 18 of FIG. 1. Shuttle body 302 is of generally cylindrical shape having cylindrical surface 304, O-ring groove 306, cylindrical surface 308, and O-ring groove 310. Shuttle body 302 also includes holes 312a and 312b which separately or combinably serve as a logic port, shuttle chamber 314 which is generally cylindrical in shape and which includes a cylindrical surface 315, end 316 which closes shuttle chamber 314 at one end thereof, logic port or concentric hole 318, and seat 322 which preferably is of frustoconical shape.

Optionally, hole 318 is reduced in diameter for a portion of the length thereof to form orifice or fluid restrictor 320. Fluid restrictor 320 may be used in the FIG. 1 embodiment for synthetic signal generator 128 or in the FIG. 2 embodiment for either synthetic generator 258a or 258b.

Logic valve 300 also includes plug portion 324 which is press fitted into a portion of cylindrical surface 315 of shuttle chamber 314, ball shuttle or blocking means 326, and spring or resilient bias means 328. Plug portion 324 includes end 330, logic port 332 which is concentric with shuttle chamber 314 and longitudinal axis 334 thereof, counterbore 336 that includes annular bottom surface 338 which serves as a stop means for spring 328, and seat 340 that is preferably frustoconical in shape.

Spring 328 is preferably sized to have a free length which is insufficient to actuate ball shuttle into engagement with seat 322.

A Second Embodiment of the Logic Valve

Referring now to FIGS. 4A and 4B, spring biased logic valve 350 is usable as diverter valve 30 or as any one of a plurality of series connected and spring biased logic valves such as logic valves 214a, 214b, and 214c.

FIGS. 4A and 4B show a portion of a housing 352 and O-rings 354 and 356. Logic valve 350 includes shuttle chamber 358 having cylindrical surface 360, seats 362a and 362b which are inner surfaces of ends 364a and 364b, holes 366a, 366b, 366c, and 366d that form one logic port, logic port or concentric hole 368, logic port or concentric hole 370, poppet shuttle or blocking means 372 that includes conical ends 374a and 374b, and spring or resilient bias means 376.

Poppet shuttle 372 is preferably fitted into shuttle chamber 358 closer than ball shuttle 326 is fitted into shuttle chamber 314, so that poppet shuttle 372 is guided by cylindrical surface 360 of shuttle chamber 358 for concentric seating of conical ends 374a and 374b into respective ones of seats 362a and 362b.

Optionally, poppet shuttle 372 is sealingly fitted into shuttle chamber 358 so that cylindrical surface 378 of poppet shuttle 372 cooperates with holes 366a, 366b, 366c, and 366d, to selectively block logic ports 368 and 370 from the four aforementioned holes, thereby obviating the necessity of using seats 362a and 362b and conical ends 374a and 374b.

A Third Embodiment of the Logic Valve

Figure 5:
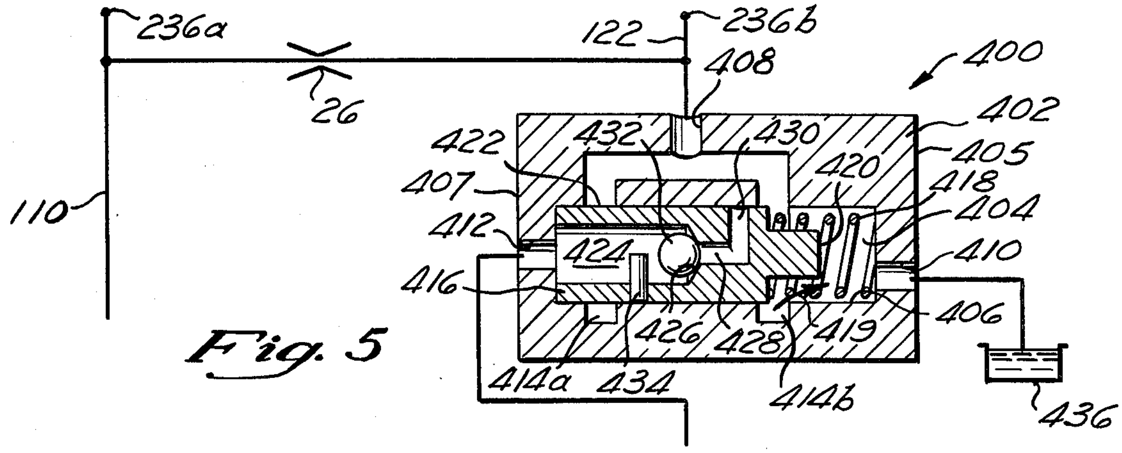
FIG. 5 is a cross sectional drawing of a signal fluid diverter valve and includes a portion of the schematic drawing for showing connections thereof into the embodiment of FIG. 1.

Referring now to FIG. 5, spring biased logic valve 400 may be used for diverter valve 30 of FIG. 1; and the conduits shown in FIG. 5 clearly show the fluid connections that are required.

Logic valve 400 includes housing or body 402 having shuttle chamber 404 that includes cylindrical surface 406, ends 405 and 407 which close shuttle chamber 404, logic port 408, logic port 410, logic port 412, and branch ports 414a and 414b. Logic valve 400 also includes poppet or piston shuttle 416, and spring or resilient bias means 418.

Poppet or piston shuttle 416 includes spring adapter and stop portion 420, cylindrical outer surface 422, bore 424, seat 426, longitudinal passage 428, transverse passage 430, check ball 432, and ball stop 434.

In operation, fluid pressure in logic port 412 is attenuated by fluid flow through an attenuation flow path such as attenuation flow path 56 of FIG. 1, allowing piston shuttle 416 to be moved by spring 418 to the position shown, and thereby opening an additional or auxiliary attenuation flow path 419 from logic port 408 to logic port 410 and sump 436 via branch port 414b.

When load actuating pressure is subsequently supplied to logic port 412 from a load signal passage such as load signal passage 46b of FIG. 1 and the load sensing flow path thereof, check ball 432 sealingly engages seat 426, piston shuttle 416 is forced to the right, closing fluid communication from branch port 414*b* to sump 436 but also opening transverse passage 430 to branch port 414*b*; so that signal fluid, as supplied by restrictor 26, flows through transverse passage 430 and past check ball 432 to logic port 412 and on to a fluid motor (not shown, same as fluid motor 20 of FIG. 1). Thus seat 426 and check ball 432 provide a one-way flow means that permits fluid communication from branch port 414*b* to logic port 410 to be cut off before fluid communication is opened from branch port 414*a* to logic port 412 without blocking the flow of signal fluid as constantly supplied by restrictor 26.

Use of an Occluder Valve

System 10 of FIG. 1 utilizes diverter valve 30 as a means for further limiting the rate of fluid flow of signal fluid from the pump to logic port 70 of diverter valve 30 and to signal control port 44 except when logic port 70 is pressurized. This is accomplished by providing auxiliary attenuation flow path 82. This flow of signal fluid is limited by restrictor 26 but the flow thereof through attenuation flow path 56 is further limited by providing auxiliary attenuation flow path 82.

System 200 of FIG. 2 utilizes series connected logic valves 214*a*, 214*b*, and 214*c* to provide auxiliary attenuation flow path 262 and thereby to provide a means for further limiting the rate of fluid flow of signal fluid from the pump to logic port 240*c* of logic valve 214*c* except when logic port 240*c* is pressurized.

Figure 6:
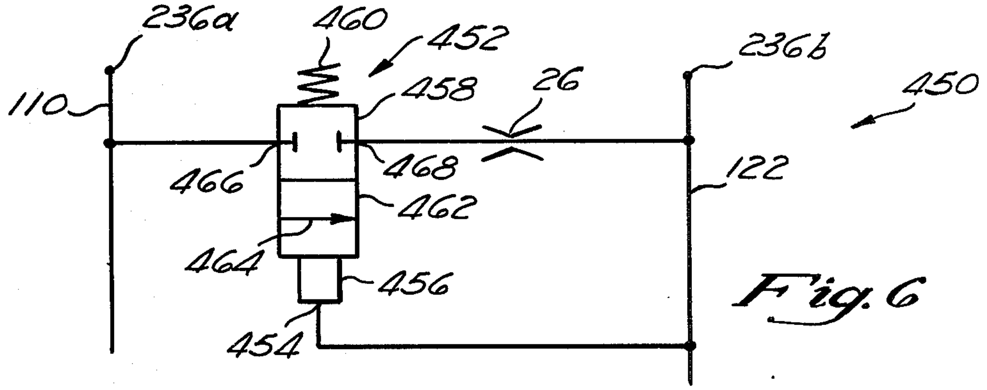
FIG. 6 is a schematic drawing of an occluder valve and the connections thereof into the embodiments of FIGS. 1 and 2.

Referring now to FIG. 6, schematic 450 utilizes occluder valve 452 as a means for further limiting the rate of fluid flow of signal fluid from pump 14 and pressure conduit 110 to signal conduit 122 and logic port 454 except when logic port 454 is pressurized by pressurized fluid from a load signal passage (not shown, similar to load signal passage 46*b* of FIG. 1). Then, pressurized fluid in signal conduit 122 is applied to operator 456 via logic port 454, moving occluder valve 452 from position 458, as shown, against the opposition of spring 460 to position 462 wherein flow path 464 is established intermediate of occluder ports 466 and 468 and signal fluid is supplied from pressure conduit 110 to signal conduit 122 via restrictor 26.

An Embodiment of an Occluder Valve

Figure 7:
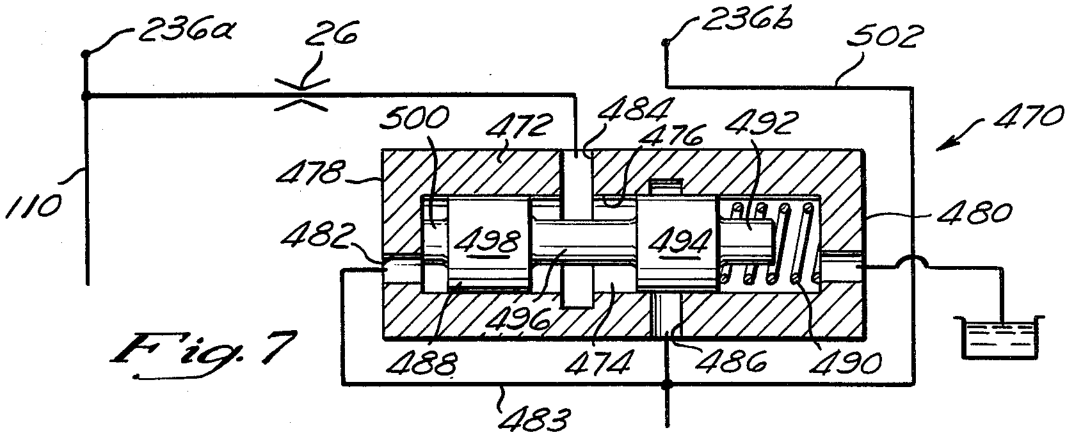
FIG. 7 is a cross sectional drawing of an occluder valve and the connections thereof for use in the embodiments of FIGS. 1 and 2.
Figure 8:
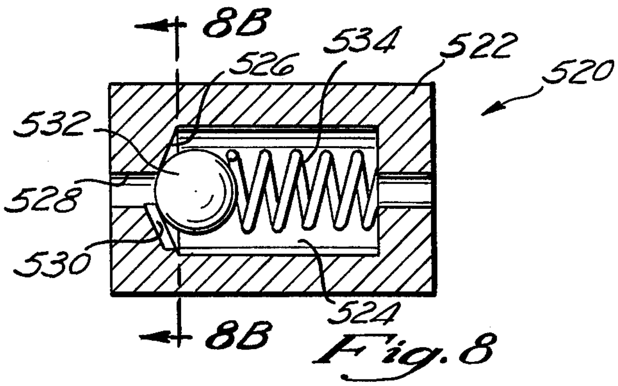
FIG. 8A is a cross sectional drawing of a synthetic signal generator of the relief valve type in which means is provided for limited bidirectional flow through the synthetic signal generator without lifting the ball poppet thereof from the seat.
FIG. 8B is a cross sectional view of the body of the synthetic signal generator of FIG. 8A, taken substantially as shown by cross section line B—B.
Figure 8B:
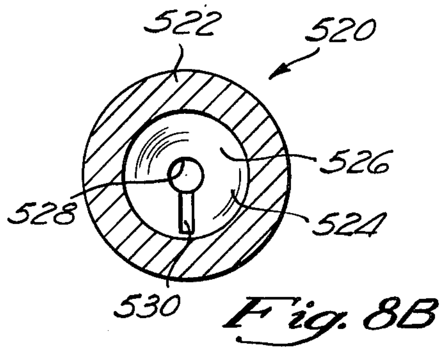

Referring now to FIG. 7, occluder valve 470 includes occluder body or housing 472 having occluder chamber 474 that includes cylindrical surface 476, ends 478 and 480, logic port 482, and occluder ports 484 and 486. Occluder valve 470 also includes occluder plunger 488 and spring or resilient bias means 490. Occluder plunger 488 includes stop portion 492, land 494, reduced diameter portion 496, land 498, and stop portion 500.

Referring now to FIGS. 1 and 7, occluder valve 470 may be used in the system of FIG. 1 as a replacement for diverter valve 30, the connection between restrictor 26 and signal chamber 68 being deleted, and conduit 502 being used to communicate signal chamber 68 with logic port 64*a* of logic valve 32*a*.

In operation, pressurized fluid, as supplied by load signal passage 46*b*, is applied to logic port 482 via conduit 483, moving occluder plunger 488 to the right, against the opposition of spring 490, and opening occluder port 484 to occluder port 486 via reduced diameter portion 496. Then the signal fluid, as supplied by restrictor 26, flows to load signal passage 46*b* and on to motor port 96*b* of fluid motor 20; and this signal fluid is pressurized by the sum of the load actuating pressure of fluid motor 20 and the pressure differential across any synthetic signal generators, such as restrictors 128 and 48*b*.

Referring now to FIGS. 6 and 7, occluder valve 452 is connected in series with restrictor 26, being intermediate of conduit 110 and point 236*b*, and being intermediate of conduit 110 and restrictor 26. Similarly, occluder valve 470 is connected in series with restrictor 26, being intermediate of conduit 110 and point 236*b*, and being intermediate of restrictor 26 and point 236*b*.

An Embodiment of a Synthetic Signal Generator

Referring now to FIGS. 1, 2, 8A and 8B, synthetic signal generator 520 is an embodiment of synthetic signal generator 252 which is shown schematically in FIG. 2 and includes both the function of relief valve 254 and the function of restrictor 256.

Synthetic signal generator 520 includes body 522 having poppet chamber 524, seat 526, port 528, and restrictor groove 530 in seat 526. Synthetic signal generator 520 also includes ball poppet 532 and spring 534.

Seat 526, ball poppet 532, and spring 534 cooperate to provide the relief valve function of relief valve 254 of FIG. 2; and restrictor groove 530 provides the restriction function of restrictor 256 of FIG. 2, and allows a limited quantity of bidirectional fluid flow without the unseating of poppet 532 from seat 526, for attenuation flow of signal fluid through an attenuation flow path, corresponding to attenuation flow path 56 of FIG. 1, and for flow of fluid through a load sensing flow path, corresponding to flow path 126*b* of FIG. 1, and through a signal control port corresponding to signal control port 44, to actuate ball shuttle 248*c* of FIG. 2 into sealing engagement with seat 246*c*.

While there have been described above the principles of this invention in connection with specific apparatus, it is to be clearly understood that this description is made only by way of example and not as a limitation to the scope of the invention. What is claimed is:

1. In a load responsive hydraulic system of the type which includes a source (12 of FIG. 1 or 202 of FIG. 2) of pressurized fluid having a pump (14 or 204) and a sump (16 or 206), a fluid actuated device (20), a directional control valve (18) having a movable valving element (34) and having both an operating position wherein fluid from said pump is supplied to said fluid actuated device at the load actuating pressure thereof and a standby position wherein said fluid actuated device is isolated from said pump, a fluid responsive means (22 or 208, where 208 = 210 + 212) having a signal chamber (68 or 232) therein and being effective to control the pressure and effective output of said pump in response to the pressure magnitude of a signal fluid supplied to said signal chamber, the improvement which comprises:

signal control means, including a signal control port (44) in said control valve and including cooperating portions (58, 54, and 84) of said valving element, for establishing a load sensing flow path (126*a* or 126*b*) which communicates said signal control port with said fluid actuated device to sense said load actuating pressure when said control valve is in said operating position, and for establishing an attenuation flow path (56) which communicates said signal control port with said sump (16*e*) to attenuate the fluid pressure in said signal control port to said sump when said control valve is in said standby position; and signal fluid supply and logic means (26 + 30 + 32*a* + 32*b* + 32*c* of FIG. 1, or 26 + 214*a* + 214*b* + 214*c* of FIG. 2, or 400 of FIG. 5 + 26 and 32*a*, etc., of FIG. 1, or 452 of FIG. 6 + 26 and 32*a*, etc., of FIG. 1, or 470 of FIG. 7 + 26 and 32*a*, etc., of FIG. 1), being connected to said source, being connected to said signal chamber, and being operatively connected to said signal control port, for continuously supplying a limited flow rate of fluid flow from said pump to said signal chamber for use as said signal fluid, for supplying said signal fluid to said signal control port, and for further limiting the rate of fluid flow of said signal fluid from said pump to said signal control port whenever said attenuation flow path is established by said signal control means.

2. In a load responsive hydraulic system of the type which includes a source of pressurized fluid having a pump and a sump, a fluid actuated device, a directional control valve having a movable valving element and having both an operating position wherein fluid from said pump is supplied to said fluid actuated device at the load actuating pressure thereof and a standby position wherein said fluid actuated device is isolated from said pump, a fluid responsive means having a signal chamber therein and being effective to control the pressure and effective output of said pump in response to the pressure magnitude of a signal fluid supplied to said signal chamber, the improvement which comprises:

signal control means, including a signal control port in said control valve and including cooperating portions of said valving element, for establishing a load sensing flow path which communicates said signal control port with said fluid actuated device to sense said load actuating pressure when said control valve is in said operating position, and for establishing an attenuation flow path which communicates said signal control port with said sump to attenuate the fluid pressure in said signal control port to said sump when said control valve is in said standby position; and signal fluid supply and logic means, being connected to said source, being connected to said signal chamber, and having a logic port (70 of FIG.1, 240*c*, etc., of FIG. 2, 318 of FIG. 3A, 368 of FIG. 4A, 412 of FIG. 5, 454 of FIG. 6, or 482 of FIG. 7) operatively connected to said signal control port, for continuously supplying a limited flow rate of fluid flow from said pump to said signal chamber for use as said signal fluid, for supplying said signal fluid to said logic port when said logic port is pressurized, and for further limiting the rate of fluid flow of said signal fluid from said pump to said logic port except when said logic port is pressurized.

3. A system as claimed in claim 2 in which said system includes synthetic signal generator means (48*a*, 48*b*, or 128 of FIG. 1, or 252 of FIG. 2), being interposed into said system, for raising the fluid pressure in said signal chamber (68 or 232) above said load actuating pressure when said load sensing flow path (126*a* or 126*b*) is established and said signal fluid flows to said fluid actuated device (20).

4. A system as claimed in claim 2 in which said system includes synthetic signal generator means (128), being interposed into said signal fluid supply and logic means (26 + 30 + 32*a* + 32*b* + 32*c*), for raising the fluid pressure in said signal chamber (68) above said load actuating pressure when said load sensing flow path (126*a* or 126*b*) is established and said signal fluid flows to said fluid actuated device (20).

5. In a load responsive hydraulic system of the type which includes a source (12 of FIG. 1 or 202 of FIG. 2) of pressurized fluid having a pump (14 or 204) and a sump (16 or 206), a fluid actuated device (20), a directional control valve (18) having a movable valving element (34) and having both an operating position wherein fluid from said pump is supplied to said fluid actuated device at the load actuating pressure thereof and a standby position wherein said fluid actuated device is isolated from said pump, and a fluid responsive means (22 or 208, where 208 = 210 + 212) having a signal chamber (68 or 232) therein and being effective to control the pressure and effective output of said pump in response to the pressure magnitude of a signal fluid supplied to said signal chamber, the improvement which comprises:

signal fluid supply means (26), being connected to said source and to said signal chamber, for supplying a limited flow of fluid from said pump to said signal chamber for use as said signal fluid;

signal control means, including a signal control port (44) in said control valve and including cooperating portions (58, 54, and 84) of said valving element, for establishing a load sensing flow path (126*a* or 126*b*) which communicates said signal control port with said fluid actuated device to sense said load actuating pressure when said control valve is in said operating position, and for establishing an attenuation flow path (56) which communicates said signal control port with said sump (16*e*) to attenuate the fluid pressure in said signal control port to said sump when said control valve is in said standby position; and signal fluid logic means, having a first logic port (70 of FIG. 1, 240*c* of FIG. 2, 318 of FIG. 3A, 368 of FIG. 4A, or 412 of FIG. 5) connected to said signal control port, having a second logic port (72, 242*c*, 332 of FIG. 3A, 370 of FIG. 4A, or 410 of FIG. 5) and, having a third logic port (78, 238*c*, 312*a*, 366*a*, or 408) connected to said signal chamber, for establishing fluid communication from said third logic port to said first logic port and for blocking fluid communication from said first and third logic ports to said second logic port when said first logic port is pressurized substantially above any fluid pressure in said second logic port, and for establishing fluid communication from said third logic port to said second logic port when the fluid pressures in said first and second logic ports are substantially equal.

6. A system as claimed in claim 5 in which said logic means further comprises a shuttle chamber (314, etc.) having first and second ends (316 and 330), a movable shuttle (326) in said chamber, and resilient bias means (328) in said chamber urging said shuttle away from said second end;

said first and second logic ports (318 and 332) open into said chamber proximal to respective ones of said first and second ends; and said third logic port (312*a* and/or 312*b*) opens into said shuttle chamber intermediate of said ends; whereby said establishing of fluid communication from said third logic port to said second logic port is accomplished by said resilient means urging said shuttle away from said second end and said second logic port proximal thereto.

7. A system as claimed in claim 6 in which said proximity of said first and second logic ports (318 and 332, etc.) to respective ones of said ends (316 and 330) comprises said logic ports being disposed within said ends;

said ends comprise first and second seats (322 and 340); and said blocking of said first and second ports comprises said shuttle (326 or 372) separately and selectively sealing against said first and second seats.

8. A system as claimed in claim 6 in which said resilient bias means (328, 376, or 418) comprises a helical coil spring of the compression type.

9. A system as claimed in claim 6 in which said movable shuttle (372 or 416) sealably engages portions of said shuttle chamber (358 or 404) intermediate of said first and second ends in performing said selective occlusion of said first and second logic ports.

10. A system as claimed in claim 6 in which said shuttle chamber (358 or 404) is cylindrical in shape, and said shuttle comprises a cylindrically shaped shuttle (372 or 416) being slidably fitted into said shuttle chamber in substantially fluid sealing engagement therewith.

11. A load responsive hydraulic system of the type which includes a source of pressurized fluid having a pump and a sump, a fluid actuated device, a directional control valve having a movable valving element and having both an operating position wherein fluid from said pump is supplied to said fluid actuated device at the load actuating pressure thereof and a standby position wherein said fluid actuated device is isolated from said pump, a fluid responsive means having a signal chamber therein and being effective to control the pressure and the effective output of said pump in response to the pressure magnitude of a signal fluid supplied to said signal chamber, the improvement which comprises:

signal fluid supply means, being connected to said source and to said chamber, for supplying a limited flow of fluid from said pump to said signal chamber for use as said signal fluid;

signal control means, including a signal control port in said control valve and including cooperating portions of said valving element, for establishing a load sensing flow path which communicates said signal control port with said fluid actuated device to sense said load actuating pressure when said control valve is in said operating position, and for establishing an attenuation flow path which communicates said signal control port with said sump to attenuate the fluid pressure of said signal control port to said sump when said control valve is in said standby position; and signal fluid logic means (30 and 32*b* of FIG. 1, or 214*a* and 214*c* of FIG. 2), having a first logic port (66*b* or 240*c*) connected to said signal control port (44), having a second logic port (60*b* or 240*a*) connectable to a fluid pressure, having a third logic port (78 or 238*a*) connected to said signal chamber (68 or 232), and having a fourth logic port (72 or 242*c*) operatively connected to said sump (16*b* or 206*c*), for establishing fluid communication between said third logic port and said first logic port and for blocking fluid communication from said third logic port to said second and fourth logic ports when said first logic port is pressurized above any fluid pressure in said second logic port, for establishing fluid communication between said third logic port and said second logic port and for blocking fluid communication from said third logic port to said first and fourth logic ports when said second logic port is pressurized above any fluid pressure in said first logic port, and for establishing fluid communication from said third logic port to said fourth logic port when said first and second logic ports are pressurized substantially equally to said fourth logic port.

12. A system as claimed in claim 11 in which said signal fluid logic means comprises a first three-port logic valve (30) having said third (78) and fourth (72) logic ports and having a fifth logic port (70); and a second three-port logic valve (32*b*) having said first (66*b*) and second (60*b*) logic ports, and having a sixth logic port (64*b*) connected to said fifth logic port (70).

13. A system as claimed in 12 in which said first three-port logic valve (30) includes a first shuttle means (76) for separately and selectively blocking said fourth (72) and fifth (70) logic ports, said second three-port logic valve (32*b*) includes second shuttle means (62*b*) for separately and selectively blocking said first (66*b*) and second (60*b*) logic ports, and said means for establishing fluid communication from said third logic port (78) to said fourth logic port (72) when said first (66*c*) and second (60*b*) logic ports are pressurized substantially equally to said fourth logic port (72) comprises resilient means (74) urging said first shuttle (76) toward said fifth logic port (70).

14. A system as claimed in 11 in which said signal fluid logic means comprises a first three-port logic valve (214*a*) having said second (240*a*) and third (238*a*) logic ports and having a fifth logic port (242*a*); and a second three-port logic valve (214*c*) having said first (240*c*) and fourth (242*c*) logic ports.

15. A system as claimed in 14 in which said first three-port logic valve (214*a*) includes first shuttle means (248*a*) for separately and selectively blocking said second (240*a*) and fifth (242*a*) logic ports, said second three-port logic valve (214*c*) includes second shuttle means (248*c*) for separately and selectively blocking said first (240*c*) and fourth logic ports (242*c*), and said means for establishing fluid communication from said third logic port (238*a*) to said fourth logic port (242*c*) when said first (240*c*) and second (240*a*) logic ports are pressurized substantially equally to said fourth logic port (242*c*) comprises resilient means (250*a* + 250*c*) for urging said first shuttle (248*a*) toward said second (240*a*) logic port and for urging said second shuttle (248*c*) toward said first logic port (240*c*).

16. In a load responsive hydraulic system of the type which includes a source of pressurized fluid having a pump and a sump, a fluid actuated device, a directional control valve having a movable valving element and having both an operating position wherein fluid from said pump is supplied to said fluid actuated device at the load actuating pressure thereof and a standby position wherein said fluid actuated device is isolated from said pump, a fluid responsive means having a signal chamber therein and being effective to control the pressure and the effective output of said pump in response to the pressure magnitude of a signal fluid supplied to said signal chamber, the improvement which comprises:

signal fluid supply means, being connected to said source and to said chamber, for supplying a limited flow of fluid from said pump to said signal chamber for use as said signal fluid;

signal control means, including a signal control port in said control valve and including cooperating portions of said valving element, for establishing a load sensing flow path which communicates said signal control port with said fluid actuated device to sense said load actuating pressure when said control valve is in said operating position, and for establishing an attenuation flow path which communicates said signal control port with said sump to attenuate the fluid pressure of said signal control port to said sump when said control valve is in said standby position;

a first logic valve (30 or 214*a*) having first (70 or 242*a*), second (72 or 240*a*), and third (78 or 238*a*) logic ports, having a first shuttle (76 or 248*a*) separately and selectively blocking said first (70 or 242*a*) and second (72 or 240*a*) logic ports from said third logic port (78 or 238*a*), and having said third logic port (78 or 238*a*) connected to said signal chamber (68 or 232);

a second logic valve (32*b* or 214*c*) having fourth (66*b* or 240*c*), fifth (60*b* or 242*c*), and sixth (64*b* or 238*c*) logic ports, having a second shuttle (62*b* or 248*c*) separately and selectively blocking said fourth (66*b* or 240*c*) and fifth (60*b* or 242*c*) logic ports from said sixth logic port (64*b* or 238*c*), having said sixth logic port (64*b* or 238*c*) connected to said first logic port (70 or 242*a*), and having said fourth logic port (66*b* or 240*c*) connected to said signal control port (44);

a conduit (75 or 261) connecting a previously unconnected one (72 or 242*c*) of said logic ports to said sump (16*b* or 206*c*); and resilient bias means (74 or 250*a*) for urging one of said shuttles to a position wherein said third logic port (78 or 238*a*) is communicated with said sump (16*b* or 206*c*) when all of said logic ports have substantially the same fluid pressure therein.

17. A system as claimed in claim 16 in which said system includes synthetic signal generator means (48*a*, 48*b*, 128, or 252), being interposed into said system, for raising the fluid pressure in said signal chamber (68 or 232) above said load actuating pressure when said load sensing flow path (126*a* or 126*b*) is established and said signal fluid flows to said fluid actuated device (20).

18. A system as claimed in claim 17 in which said interposition of said synthetic signal generator into said system comprises interposing said synthetic signal generator (48*a* or 48*b*) into said signal control means (124).

19. A system as claimed in claim 17 in which said interposition of said synthetic signal generator (252) into said system (200) comprises interposing said synthetic signal generator into said system intermediate of said signal fluid supply restrictor (26) and said attenuation flow path (56).

20. A system as claimed in claim 17 in which said one logic port comprises said second logic port (72), said one logic valve comprises said first logic valve (30), said first shuttle comprises a ball (76), and said resilient means comprises a helical coil spring (74) being interposed between said ball (76) and said second logic port (72).

21. A system as claimed in claim 17 in which said one logic port comprises said fifth logic port (242*c*), said first and second shuttles comprise respective ones of first (248*a*) and second (248*c*) balls, and said resilient bias means comprises a first helical coil spring (250*a*) being interposed between said first ball (248*a*) and said first logic port (242*a*) and a second helical coil spring (250*c*) being interposed between said second ball (248*c*) and said fifth logic port (242*c*).

22. A system as claimed in claim 17 in which said interposition of said synthetic signal generator into said system comprises interposing said synthetic signal generator (128) into said system at a point wherein said signal fluid flowing from said third logic port (78) to said fourth logic port (66*b*) is restricted and pressurized by said synthetic signal generator (128), said signal fluid flowing from said third logic port (78) to said fifth logic port (60*b*) is restricted and pressurized by said synthetic signal generator (128), but signal fluid flowing from said third logic port (78) to said one logic port (72) and to said sump (16*b*) avoids being restricted and pressurized by said synthetic signal generator (128).

23. A system as claimed in claim 22 in which said one logic port comprises said second logic port (72), said one logic valve comprises said first logic valve (32), said first shuttle comprises a ball (76), and said resilient bias means comprises a helical coil spring (74) being interposed between said ball (76) and said second logic port (72).

24. A system as claimed in claim 17 in which said synthetic signal generator comprises an orifice (128).

25. A system as claimed in claim 17 in which said synthetic signal generator comprises a relief valve (252 of FIG. 2 or 520 of FIG. 8).

26. A system as claimed in claim 25 in which said relief valve includes a relief valve seat (526) and a ball poppet (532) resiliently engaging said seat, and said synthetic signal generator comprises means (530) for allowing limited quantity bidirectional flow through said synthetic signal generator without said ball poppet leaving said engagement with said relief valve seat.

27. A three-port logic valve (300, etc.) which comprises:

a body (302);

a shuttle chamber (314) in said body being closed at first (316, etc.) and second (330, etc.) ends thereof by said body;

a first logic port (332, etc.) in said body being proximal to one (330) of said ends of said shuttle chamber;

a second logic port (318) in said body being proximal to the other (316) said end of said shuttle chamber;

a third logic port (312*a* and/or 312*b*, etc.) in said body communicating with said shuttle chamber intermediate of said first and second logic ports;

a shuttle (326, etc.) being slidably disposed in said shuttle chamber, being movable by fluid pressure in said first logic port to a first position wherein said first logic port is communicated with said third logic port and wherein communication between said third logic port and said second logic port is blocked by said shuttle, and being movable by fluid pressure in said second logic port to a second position wherein said second logic port is communicated with said third logic port and wherein communication between said third logic port and said first logic port is blocked by said shuttle; and resilient bias means (328) for urging said shuttle away from said second position; whereby fluid communication from said third logic port to said first logic port is assured by said resilient means when said fluid pressures in said first and second logic ports are substantially equal, said resilient bias means (328) including means (short free length) for preventing said resilient bias means from resiliently urging said shuttle (326) to said first position wherein communication between said third logic port (312*a*) and said second logic port (318) is blocked.

28. A three-port logic valve (300, etc.) which comprises:

a body (302);

a shuttle chamber (314) in said body being closed at first (316, etc.) and second (330, etc.) ends thereof by said body;

a first logic port (332, etc.) in said body being proximal to one (330) of said ends of said shuttle chamber;

a second logic port (318) in said body being proximal to the other (316) said end of said shuttle chamber;

a third logic port (312*a* and/or 312*b*, etc.) in said body communicating with said shuttle chamber intermediate of said first and second logic ports;

a shuttle (326, etc.) being slidably disposed in said shuttle chamber, being movable by fluid pressure in said first logic port to a first position wherein said first logic port is communicated with said third logic port and wherein communication between said third logic port and said second logic port is blocked by said shuttle, and being movable by fluid pressure in said second logic port to a second position wherein said second logic port is communicated with said third logic port and wherein communication between said third logic port and said first logic port is blocked by said shuttle; and resilient bias means (328) for urging said shuttle away from said second position; whereby fluid communication from said third logic port to said first logic port is assured by said resilient means when said fluid pressures in said first and second logic ports are substantially equal, said shuttle chamber (314) including a longitudinal axis (334) and said ends (316 & 330) being disposed orthogonally thereto;

said proximity of said first (332) and second (318) logic ports to said ends comprising one of said logic ports being disposed in each of said ends;

said ends comprising first (340) and second seats (322) communicating with respective ones of said first and said second logic ports; and said blocking of said first and second logic ports comprising said shuttle moving in a first longitudinal direction in said shuttle chamber and sealingly engaging said first seat and moving in a second longitudinal direction and sealingly engaging said second seat.

29. A three-port logic valve (300, etc.) as claimed in claim 28 in which said shuttle chamber (314) includes a cylindrical surface (315) being concentrically disposed around said longitudinal axis (334), said first (332) and second (318) logic ports are disposed concentrically with respect to said longitudinal axis, and said ends (316 & 330) comprise frustoconical surfaces extending longitudinally outward from said cylindrical surface to respective ones of said first and second logic ports to form said seats (340 & 322).

30. A three-port logic valve as claimed in claim 29 in which said first logic port (332) includes stop means (338) for locating one end of a helical coil compression spring; and said resilient bias means comprises a helical coil compression spring (328) being disposed between said stop means and said shuttle (326).

31. A three-port logic valve as claimed in claim 28 in which said resilient bias means comprises a spring (328), and said spring has a free length that is sufficient to resiliently urge said shuttle (326) away from said first seat (340) but that is insufficient to urge said shuttle into contact with second seat (322).

32. A three-port logic valve (300, etc.) as claimed in claim 30 in which said first logic port (332) includes a counterbore portion (336) extending outwardly from said first seat, and having an annular bottom surface (338); and said stop means comprises said bottom surface.

33. A three-port logic valve (300) as claimed in claim 32 in which said shuttle comprises a ball (326).

34. A logic system which comprises a first logic valve (30 or 214*a*) having first (72 or 240*a*), second (70 or 242*a*), and third (78 or 238*a*) logic ports, and having means (76 or 248*a*) for separately and selectively blocking said first and second logic ports from said third logic port in response to fluid pressures in respectively opposite ones of said first and second logic ports;

a second logic valve (32*b* or 214*b*) having fourth (66*b* or 242*b*), fifth (60*b* or 240*b*), and sixth (64*b* or 238*b*) logic ports, having means (62*b* or 248*b*) for separately and selectively blocking said fourth and fifth logic ports from said sixth logic port in response to fluid pressures in respectively opposite ones of said fourth and fifth logic ports, and having said sixth logic port connected to said second logic port; and means for actuating one of said blocking means (76, 248*a*, or 248*b*) and for communicating said third logic port with a predetermined one (72 or 242*b*) of the other unconnected ones of said logic ports when substantially equal fluid pressures are applied to all of said unconnected logic ports.

35. A logic system as claimed in claim 34 in which said one blocking means comprises first said blocking means (76), and said predetermined one logic port comprises said first logic port (72).

36. A logic system as claimed in claim 35 in which said blocking means comprises a shuttle (76).

37. A logic system as claimed in claim 35 in which said actuator means comprises resilient bias means (74).

38. A logic system as claimed in claim 35 in which said blocking means comprises a ball shuttle (76), and said actuator means comprises a helical coil spring (74) being interposed into said first logic valve and compressively urging said ball shuttle away from said first logic port (72) without urging said ball shuttle into blocking contact with said second logic port (70).

39. A logic system as claimed in claim 34 in which said one blocking means comprises said second blocking means (248*b*), and said predetermined one logic port comprises one (242*b*) of said unconnected logic ports in said second logic valve (214*b*).

40. A logic system as claimed in claim 34 in which first said and second said blocking means comprise respective ones of first (248*a*) and second (248*b*) shuttles; and said means for actuating comprises a first resilient bias means (250*a*) in said first logic valve (214*a*) urging said first shuttle away from said second logic port (242*a*) without urging said first shuttle into sealing engagement with said first logic port (240*a*), and a second resilient bias means (250*b*) in said second logic valve (214*b*) urging said second shuttle away from one (242*b*) of said unconnected logic ports therein without urging said second shuttle into sealing engagement with the other (240*b*) of said unconnected logic ports therein.

41. A logic system as claimed in claim 40 in which one of said shuttles comprises a ball (248*a* or 248*b*), and one of said resilient bias means comprises a helical coil spring (250*a* or 250*b*).

42. In a load responsive hydraulic system of the type which includes a source (12 of FIG. 1 or 202 of FIG. 2) of pressurized fluid having a pump (14 or 204) and a sump (16 or 206), a fluid actuated device (20), a directional control valve (18) having a movable valving element (34) and having both an operating position wherein fluid from said pump is supplied to said fluid actuated device at the load actuating pressure thereof and a standby position wherein said fluid actuated device is isolated from said pump, a fluid responsive means (22 or 208, where 208 = 210 + 212) having a signal chamber (68 or 232) therein and being effective to control the pressure and effective output of said pump in response to the pressure magnitude of a signal fluid supplied to said signal chamber, the improvement which comprises:

signal control means, including a signal control port (44) in said control valve and including cooperating portions (58, 54, and 84) of said valving element, for establishing a load sensing flow path (126*a* or 126*b*) which communicates said signal control port with said fluid actuated device to sense said load actuating pressure when said control valve is in said operating position, and for establishing an attenuation flow path (56) which communicates said signal control port with said sump (16*e*) to attenuate the fluid pressure in said signal control port to said sump when said control valve is in said standby position;

means (32*a* or 130, etc., of FIG. 1, or 214*a*, etc., of FIG. 2) for connecting said signal chamber to said signal control port; and pressure actuated attenuation flow path means (30 of FIG. 1 providing flow path 82, or 214*c* of FIG. 2 providing flow path 262) for communicating said signal chamber to said sump (16*b* of FIG. 1 or 206*c* of FIG. 2) through said flow path means, and for blocking communication from said signal chamber to said sump through said flow path means when said load sensing flow path senses said load actuating pressure.

43. In a load responsive hydraulic system of the type which includes a source (12 of FIG. 1 or 202 of FIG. 2) of pressurized fluid having a pump (14 or 204) and a sump (16 or 206), a fluid actuated device (20), a directional control valve (18) having a movable valving element (34) and having both an operating position wherein fluid from said pump is supplied to said fluid actuated device at the load actuating pressure thereof and a standby position wherein said fluid actuated device is isolated from said pump, and a fluid responsive means (22 or 208, where 208 = 210 + 212) having a signal chamber (68 or 232) therein and being effective to control the pressure and effective output of said pump in response to the pressure magnitude of a signal fluid supplied to said signal chamber, the improvement which comprises:

signal control means, including a signal control port (44) in said control valve and including cooperating portions (58, 54, and 84) of said valving element, for establishing a load sensing flow path (126*a* or 126*b*) which communicates said signal control port with said fluid actuated device to sense said load actuating pressure when said control valve is in said operating position, and for establishing an attenuation flow path (56) which communicates said signal control port with said sump (16*e*) to attenuate the fluid pressure in said signal control port to said sump when said control valve is in said standby position;

connecting means (32*a* or 130, etc., of FIG. 1, or 214*a*, etc., of FIG. 2) for connecting said signal chamber to said signal control port;

signal fluid supply means (26), being connected to said source and to said signal chamber, for continuously supplying a limited flow of fluid from said pump to said signal chamber for use as said signal fluid; and pressure actuated signal fluid control means (30 of FIG. 1, 214*c* of FIG. 2, 452 of FIG. 6, 478 of FIG. 7, etc.), being operatively connected to said signal chamber and to said signal control port, for further limiting the flow of said signal fluid to said signal control port except when said signal fluid is being supplied to said fluid actuated device.

44. A three-port logic valve (400) which comprises:

a body (402);

a shuttle chamber (404) in said body being closed at first (407) and second (405) ends thereof by said body:

a first logic port (410) in said body being proximal to one (405) of said ends of said shuttle chamber:

a second logic port (412) in said body being proximal to the other (407) said end of said shuttle chamber;

a third logic port (408) in said body communicating with said shuttle chamber intermediate of said first and second logic ports;

a shuttle (416) being slidably disposed in said shuttle chamber, being movable to a first position wherein said first logic port is communicated with said third logic port and wherein communication between said third logic port and second logic port is blocked by said shuttle, and being movable by fluid pressure in said second logic port to a second position wherein said second logic port is communicated with said third logic port and wherein communication between said third logic port and said first logic port is blocked by said shuttle, and resilient bias means (418) for urging said shuttle away from said second position; whereby fluid communication from said third logic port to said first logic port is assured by said resilient means when said fluid pressures in said first and second logic ports are substantially equal, said shuttle including means (bore 424, seat 426, passages 428 and 430, check ball 432, ball stop 434) for allowing fluid communication from said third logic port (408) to said second logic port (412) to be established prior to cutting off of fluid communication between said third logic port (408) and first logic port (410) during movement of said shuttle (416) from said first position to said second position.

* * * * *